Oct. 24, 1933.  H. L. SMITH  1,932,286

DYNAMO ELECTRIC MACHINE

Original Filed Dec. 14, 1929

Inventor:
Harold L. Smith,
By Edwin B. H. Towne Jr.
Atty.

Patented Oct. 24, 1933

1,932,286

UNITED STATES PATENT OFFICE 1,932,286

DYNAMO-ELECTRIC MACHINE

Harold L. Smith, Milwaukee, Wis., assignor to The Louis Allis Company, Milwaukee, Wis., a corporation of Wisconsin Application December 14, 1929, Serial No. 414,064
Renewed July 25, 1932

13 Claims. (Cl. 171—252)

The invention relates to an enclosed dynamo electric machine.

The dynamo electric machine to which the invention applies in particular is of the type provided with a laminated core having a closed endplate arranged at each end thereof to form therewith a closed inner casing.

The invention has as an object to provide an enclosed dynamo electric machine in which the laminated core will readily dissipate its heat to external air.

Another object is to provide an enclosed dynamo electric machine which will have increased capacity for a given size core and given over-all dimensions.

Another object is to provide an enclosed dynamo electric machine which is sturdy and durable.

Another object is to provide an enclosed dynamo electric machine in which access may be readily had to its interior parts and its stator and rotor windings.

Another object is to provide a dynamo electric machine which may be readily assembled and disassembled.

Another object is to provide a dynamo electric machine which may be readily and economically manufactured.

According to the invention in its fundamental aspect and as ordinarily embodied in practice, the stator is provided with a laminated core having radial ribs upon its outside to increase its heat dissipating surface, an end ring arranged upon each end of the core, connecting bars arranged at intervals around the core in spaces between the ribs and connecting the end rings to each other, and a closed end plate arranged upon each end ring and forming therewith and with the core a closed casing.

The invention is exemplified by the induction motor illustrated in the accompanying drawing in which the views are as follows.

Figure 1:
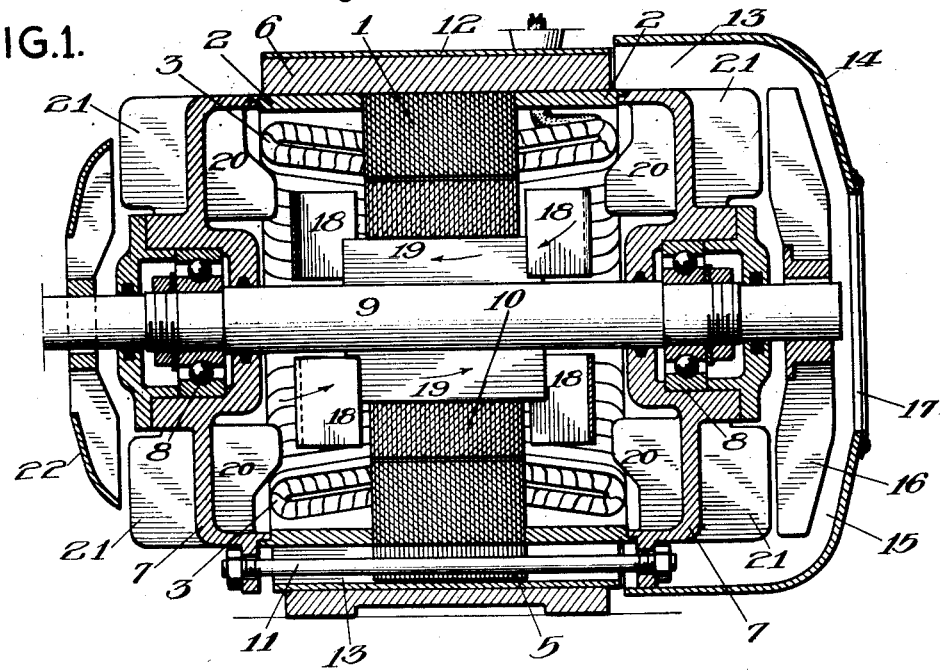
Fig. 1 is a longitudinal section through the motor.
Figure 2:
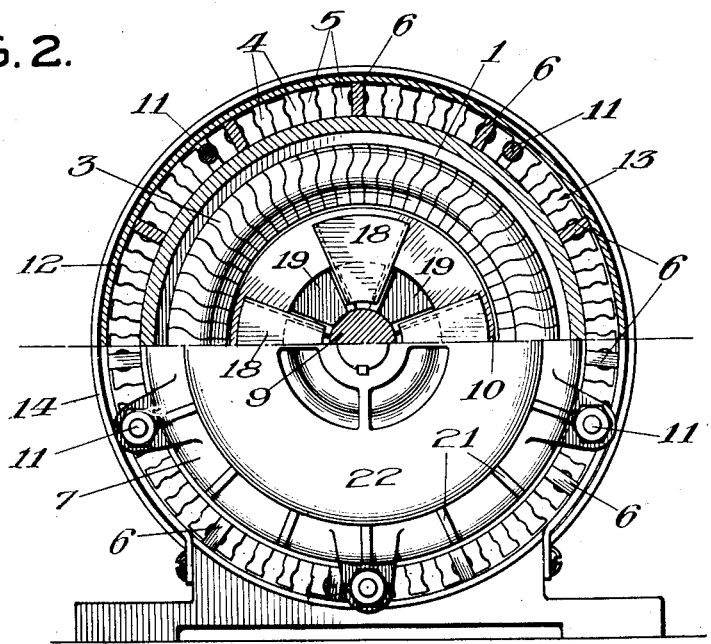
Fig. 2 is an end view partly in section.

The motor is provided with a laminated stator core 1 arranged between two end rings 2 and carrying the stator winding 3.

The core 1 has radial notches 4 formed in its periphery to provide a radial rib 5 between each two adjacent notches.

The ribs 5 increase the radiating surface of the core and function as radiators to dissipate heat from within the core.

The end rings 2 are connected to each other by connecting bars 6 which are arranged at intervals around the core 1 and fastened to each end ring by welding or otherwise.

Each bar 6 is fitted in a notch 4 to retain the core laminations in fixed positions and to provide a compact stator.

Each end ring 2 has a closed end plate 7 arranged thereon and provided at its center with a bearing 8 to support a rotor shaft 9 which carries a rotor core 10.

The core 1, the end rings 2, and the end plates 7 form a closed inner casing which excludes ambient diffusible matter from the interior of the motor.

The casing may be made to resist and confine an internal gaseous explosion by providing long lapped joints between the end rings 2 and the core 1 and between the end rings 2 and the end plates 7 and by providing elongated sleeves around the shaft 9, as disclosed in Patent No. 1,799,071.

The end plates 7 are fastened in position upon the end rings by elongated bolts 11, each of which passes through a notch 4 and connects one end plate to the other.

The bolts which fasten the end plates in position are thus arranged outside of the closed inner casing and outside of the active material of the stator core.

Each notch 4 is preferably shaped to receive either a supporting bar 6 or a bolt 11 so that any notch in one lamination may be alined with any of the notches in the other laminations when the stator core is assembled.

The bars 6 support a ventilating casing 12 which is spaced from the core 1 and the end rings 2 to provide a ventilating passage 13.

One end of the ventilating casing 12 is closed by a fan casing 14 which forms substantially a part thereof and provides a fan compartment 15 communicating with the ventilating passage 13.

The shaft 9 carries a fan 16 which is arranged in the fan compartment 15 and adapted to draw air through an inlet 17 in the fan casing 14 and force the same through the ventilating passage 13 and the notches 4.

The radiators 5, the bars 6, and the bolts 11 are arranged in the ventilating passage 13 so that the over-all diameter of the machine is not increased.

The machine may also be provided with means for creating an internal circulation of air and with additional means for dissipating heat which are the subject of a separate application Serial No. 414,063, filed on even date herewith.

The internal circulation of air is created by

U-shaped fans 18 which are carried by the rotor 10 and arranged at opposite ends of alternate air passages 19 formed therein.

The air is drawn in opposite directions through adjacent passages 19 and forced radially outward by the fans 18 and then deflected against the end plates 7.

The end plates 7 are provided with fins 20 upon the inside thereof to absorb heat from the interiorly circulated air and with fins 21 upon the outside thereof to dissipate the heat by radiation.

The fan 16 forces a current of air against one of the end plates 7 and rapidly carries away the heat radiated by the fins 21 thereon.

The heat radiated by the fins 21 on the other end plate 7 is carried away by a current of air which is created by a fan 22 driven by the shaft 10.

The invention herein set forth is susceptible of various modifications and adaptations without departing from the scope thereof as hereafter claimed.

The invention is hereby claimed as follows:

1. An enclosed dynamo electric machine, comprising a laminated stator core, an end ring arranged upon each end of said core, radial ribs formed upon the outside of said core and extending beyond said end rings to increase the heat dissipating surface of said core, means extending between adjacent ribs and connecting said end rings to each other to retain said core between the same, a closed end plate arranged upon each end ring and forming therewith and with said core a closed inner casing, a rotor arranged within said casing and having its shaft bearing in said end plates, a ventilating casing arranged around said inner casing and providing a ventilating passage over said core, and means to force air through said passage and between said ribs.

2. An enclosed dynamo electric machine, comprising a laminated stator core, an end ring arranged upon each end of said core, radial ribs formed upon the outside of said core and extending beyond said end rings to increase the heat dissipating surface of said core, means extending between adjacent ribs and connecting said end rings to each other to retain said core between the same, a closed end plate arranged upon each end ring and forming therewith and with said core a closed inner casing, a rotor arranged within said casing and having its shaft bearing in said end plates, fasteners arranged outside said casing and securing said end plates in position, a ventilating casing arranged around said inner casing and providing a ventilating passage over said core, and means to force air through said passage and between said ribs.

3. An enclosed dynamo electric machine, comprising a laminated stator core, an end ring arranged upon each end of said core, radial ribs formed upon the outside of said core and extending beyond said end rings to increase the heat dissipating surface of said core, means extending between adjacent ribs and connecting said end rings to each other to retain said core between the same, a closed end plate arranged upon each end ring and forming therewith and with said core a closed inner casing, a rotor arranged within said casing and having its shaft bearing in said end plates, fasteners arranged outside said casing and between adjacent ribs to secure said end plates in position, a ventilating casing arranged around said inner casing and providing a ventilating passage over said core, and means to force air through said passage and between said ribs.

4. An enclosed dynamo electric machine, comprising a laminated stator core, an end ring arranged upon each end of said core, radial ribs formed upon the outside of said core and extending beyond said end rings to increase the heat dissipating surface of said core, bars arranged between adjacent ribs and fastened to said end rings to connect the same to each other and to hold said core between the same, a closed end plate arranged upon each end ring and forming therewith and with said core a closed inner casing, fasteners arranged outside said inner casing to secure said end plates in position, a rotor arranged within said casing and having its shaft bearing in said end plates, a ventilating casing supported by said bars and arranged around said inner casing to provide a ventilating passage over said core, and means to force air through said passage and between said ribs.

5. An enclosed dynamo electric machine, comprising a laminated stator core, an end ring arranged upon each end of said core, radial ribs formed upon the outside of said core and extending beyond said end rings to increase the heat dissipating surface of said core, bars fitted between adjacent ribs to aline the laminations of said core and fastened to said end rings to connect the same to each other and to hold said core between the same, a closed end plate arranged upon each end ring and forming therewith and with said core a closed inner casing, fasteners arranged outside said inner casing to secure said end plates in position, a rotor arranged within said casing and having its shaft bearing in said end plates, a ventilating casing arranged around said inner casing and providing a ventilating passage over said core, and means to force air through said passage and between said ribs.

6. An enclosed dynamo electric machine, comprising a laminated stator core, an end ring arranged upon each end of said core, radial ribs formed upon the outside of said core and extending beyond said end rings to increase the heat dissipating surface of said core, bars fitted between adjacent ribs to aline the laminations of said core and fastened to said end rings to connect the same to each other and secure said core between the same, a closed end plate arranged upon each end ring and forming therewith and with said core a closed inner casing, fasteners arranged outside said casing to secure said end plates in position, a rotor arranged within said casing and having its shaft bearing in said end plates, a ventilating casing supported by said bars and arranged around said inner casing to provide a ventilating passage over said core, and means to force external air through said passage and between said ribs.

7. An enclosed dynamo electric machine, comprising a laminated stator core, an end ring arranged upon each end of said core, radial ribs formed upon the outside of said core and extending beyond said end rings to increase the heat dissipating surface of said core, bars fitted between adjacent ribs to aline the laminations of said core and fastened to said end rings to connect the same to each other and to hold said core between the same, a closed end plate arranged upon each end ring and forming therewith and with said core a closed inner casing, fasteners arranged outside said inner casing to secure said end plates in position, a rotor arranged within said casing and having its shaft bearing in said end plates, a ventilating casing supported by said bars and arranged around said inner casing to provide a ventilating passage over said core, and means to force air through said passage and between said ribs.

8. An enclosed dynamo electric machine, comprising a laminated stator core, an end ring arranged upon each end of said core, radial ribs formed upon the outside of said core and extending beyond said end rings to increase the heat dissipating surface of said core, means extending between adjacent ribs and connecting said end rings to each other to hold said core between the same, a closed end plate arranged upon each end ring and forming therewith and with said core a closed inner casing, a rotor arranged within said casing and having its shaft bearing in said end plates, means to circulate air through said rotor, a ventilating casing arranged around said inner casing and providing a ventilating passage over said core, and means to force external air through said passage and between said ribs.

9. An enclosed dynamo electric machine, comprising a laminated stator core, an end ring arranged upon each end of said core, radial ribs formed upon the outside of said core and extending beyond said end rings to increase the heat dissipating surface of said core, means extending between adjacent ribs and connecting said end rings to each other to hold said core between the same, a closed end plate arranged upon each end ring and forming therewith and with said core a closed inner casing, a rotor arranged within said casing and having its shaft bearing in said end plates, means to circulate air through said rotor, means to absorb heat from said circulated air and conduct the same outward through said end plates to external air, a ventilating casing arranged around said inner casing and providing a ventilating passage over said core, and means to force external air through said passage and between said ribs.

10. An enclosed dynamo electric machine, comprising a laminated stator core, an end ring arranged upon each end of said core, radial ribs formed upon the outside of said core and extending beyond said end rings to increase the heat dissipating surface of said core, bars fitted between adjacent ribs to aline the laminations of said core and fastened to said end rings to connect the same to each other and secure said core therebetween, a closed end plate arranged upon each end ring and forming therewith and with said core a closed inner casing, fasteners extending between adjacent ribs and connecting said end plates to each other, a rotor arranged within said casing and having its shaft bearing in said end plates, means to circulate air through said rotor, means to absorb heat from said circulated air and conduct it outward through said end plates, a ventilating casing supported by said bars and arranged around said inner casing to provide a ventilating passage over said core, and a fan arranged at each end of said inner casing and fastened to said rotor shaft.

11. A dynamo electric machine, comprising a stator provided with a laminated core having radiating ribs upon the outside thereof to increase its heat dissipating surface, an end ring arranged upon each end of said core, bars arranged in spaces between said ribs and joining said end rings together to hold said core therebetween, and an end plate arranged upon each end of said stator and having its shaft bearing in said end plates.

12. A dynamo electric machine, comprising a stator provided with a laminated core having radiating ribs upon the outside thereof to increase its heat dissipating surface, an end ring arranged upon each end of said core, bars arranged in spaces between said ribs and joining said end rings together to hold said core therebetween, a closed end plate arranged upon each end of said stator and forming therewith a closed inner casing, and an outer casing arranged over said core to conduct external air between said ribs.

13. A dynamo electric machine, comprising a stator provided with a laminated core having radiating ribs upon the outside thereof to increase its heat dissipating surface, an end ring arranged upon each end of said core, bars arranged in spaces between said ribs and joining said end rings together to hold said core therebetween, a closed end plate arranged upon each end of said stator and forming therewith a closed inner casing, and an outer casing arranged over said core to conduct external air over and between said ribs and supported by said bars.

HAROLD L. SMITH.